United States Patent Office 3,631,085
Patented Dec. 28, 1971

3,631,085
PREPARATION OF METHALLYLSILANES
Robert H. Krahnke, Keith W. Michael, and Edwin P. Plueddemann, Midland, Mich., assignors to Dow Corning Corporation, Midland, Mich.
No Drawing. Filed Mar. 23, 1970, Ser. No. 22,069
Int. Cl. C07f 7/08
U.S. Cl. 260—448.2 E                        8 Claims

ABSTRACT OF THE DISCLOSURE

The preparation of methallylsilanes which involves contacting (in an open system) a hydrogen-substituted organosilicon compound with diisobutylene, at a temperature of from 400° C. to 600° C. The present method is less difficult (and thus less expensive) than prior art methods and the recovered methallylsilanes are useful in the production of certain synthetic resins.

This invention relates to the preparation of methallylsilanes by contacting hydrogen-substituted organosilicon compounds with diisobutylene at a temperature of 400° C. to 600° C. in an open system.

Heretofore, the principle method for preparing methallylsilanes required a closed system. In contrast to the aforementioned prior art method, the present method may be conducted in an open system thereby not requiring the necessity of special and expensive pressure equipment. In addition, previous methods required certain limitations, e.g., the presence of a halogen atom on the silicon atom which are not required when following the method described herein.

In accordance with the above, the present invention relates to a method for preparing methallylsilicon compounds containing the group

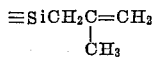

(A) Contacting in an open system (1) an organosilicon compound selected from the group consisting of
   (a) silanes of the formula R$_4$Si, and
   (b) siloxanes of the formula

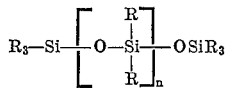

in which at least one R radical is a hydrogen atom and no more than 50 percent of the R radicals are hydrogen atoms, the remaining R radicals being selected from the group consisting of an alkyl radical of from 1 to 6 carbon atoms inclusive, an alkoxy radical of from 1 to 6 carbon atoms inclusive, a phenyl radical, a halogen atom, and a 3,3,3-trifluoropropyl radical, $n$ has a value of from 0 to 6 inclusive, with
(2) diisobutylene,
(B) Heating the above admixture to a temperature of from 400° C. to 600° C., and
(C) Thereafter recovering the methallylsilane.

By the term "open system," one merely means that the reaction is conducted under conditions whereby the reactants are passed continuously to a heated tube or the like under atmospheric pressure. This is to be distinguished from a "closed system" in which the reaction is not open to the atmosphere and thus, the reaction is necessarily carried out under pressure which is generated and determined by the particular temperature selected. This is readily accomplished by means of a sealed ampule or a metal pressure vessel.

As noted above R can be an alkyl radical of from 1 to 6 carbon atoms inclusive such as the methyl (preferred), ethyl, propyl, isopropyl, butyl, t-butyl, amyl, and the hexyl radical. The R radical can also be an alkoxy of from 1 to 6 carbon atoms inclusive such as the methoxy, ethoxy, propoxy, isopropoxy, butoxy, amyloxy, and the hexoxy radical. R may also be a phenyl radical, a 3,3,3-trifluoropropyl radical, or a halogen atom such as the chlorine, bromine, fluorine or iodine atom. As also noted above, at least one R radical must be a hydrogen atom and no more than 50 percent of the R radicals can be composed of hydrogen atoms.

The best method of practicing the present invention involves mixing the organosilicon compound (1) with the diisobutylene (2) by any conventional or feasible means. Although virtually any ratio of (1) or (2) may be employed, e.g., a mol ratio of 0.5/1 to 10/1, it has been found that an essentially equimolar ratio is preferred. The admixture is then passed through a tube which is heated to the prescribed temperature, i.e., to a temperature of from 400° C. to 600° C., and preferably at a temperature of from 400° C. to 500° C. At temperatures below 400° C., the reaction is not initiated or proceeds at such a slow rate that it is in essence impractical, whereas at temperatures exceeding 600° C. thermal decomposition is encountered. After heating, the vapors are conventionally condensed and the desired methallylsilane is collected.

The order of contacting the ingredients (1) and (2) is unimportant and any convenient technique can be used; however, it is important that the organosilicon compound (1) and the diisobutylene (2) be simultaneously heated to achieve the necessary obectives.

Some commercial diisobutylene consists of a mixture of isomers, that is,

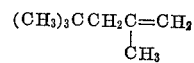

and

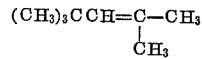

For this reason, it may be possible within the provisions of the present invention, when such mixtures are employed, in addition to obtaining methallylsilanes of the formula

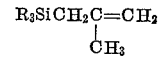

methylpropenylsilanes of the formula

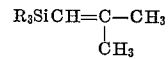

are also produced and can be collected.

The following examples are illustrative only and are not intended to limit the invention which is properly delineated in the appended claims.

EXAMPLE 1

A mixture containing 135.5 grams (1.0 mol) of a silane of the formula HSiCl$_3$ and 56.5 grams (0.5 mol) diisobutylene was passed through a 1 inch by 12 inch tube heated at a temperature of 500° C. The mixture was passed through the tube at a rate of 0.72 ml. per minute. The vapors were conventionally condensed and about 100 grams of a methallylsilane of the formula

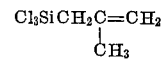

was obtained.

EXAMPLE 2

A mixture containing 10.5 grams (0.05 mol) of a siloxane of the formula $$C_6H_5-Si-O-Si-H$$
$$\phantom{C_6H_5-}|\phantom{-O-}|$$
$$\phantom{C_6H_5-}(CH_3)_2\ (CH_3)_2$$

and 5.6 grams (0.05 mol) diisobutylene was passed through a 1 inch by 12 inch tube heated to a temperature of 500° C. to 600° C. The mixture was passed through the tube at a rate of 0.72 ml. per minute. The vapors were conventionally condensed and about 1.0 gram of a methallylsilane of the formula $$C_6H_5Si-O-Si-CH_2C=CH_2$$
$$\phantom{C_6H_5}|\phantom{-O-}|\phantom{-CH_2}|$$
$$\phantom{C_6H_5}(CH_3)_2\ (CH_3)_2\ CH_3$$

was obtained.

EXAMPLE 3

A mixture containing 75.0 grams (0.65 mol) of a silane of the formula $$HSiCl_2$$
$$\phantom{HSi}|$$
$$\phantom{HSi}CH_3$$

and 74.0 grams (0.65 mol) diisobutylene was passed through a 1 inch by 12 inch tube heated at a temperature of 550° C. The mixture was passed through the tube at a rate of 0.52 ml. per minute. The vapors were conventionally condensed and about 77.0 grams of a methallylsilane of the formula $$Cl_2SiCH_2C=CH_2$$
$$\phantom{Cl_2Si}|\phantom{CH_2}|$$
$$\phantom{Cl_2Si}CH_3\ CH_3$$

was obtained.

The diisobutylene used above was a commercial grade which contained 23.0 percent of the isomer $$(CH_3)_3CCH=C-CH_3$$
$$\phantom{(CH_3)_3CCH=}|$$
$$\phantom{(CH_3)_3CCH=}CH_3$$

For this reason, in addition to the 77.0 grams of the desired methallylsilane described above, about 5.0 grams of a methylpropenylsilane of the formula $$ClSi-CH=C-CH_3$$
$$\phantom{Cl}/\phantom{Si-}|\phantom{=C}|$$
$$Cl\phantom{/Si}CH_3\ CH_3$$

was also obtained.

EXAMPLE 4

A mixture containing 13.6 grams (0.10 mol) of a silane of the formula $$C_6H_5SiH$$
$$\phantom{C_6H_5Si}|$$
$$\phantom{C_6H_5Si}(CH_3)_2$$

and 11.3 grams (0.10 mol) diisobutylene was passed through a 1 inch by 12 inch tube heated at a temperature of 450° C. to 600° C. The mixture was passed through the tube at a rate of 0.72 ml. per minute. The vapors were conventionally condensed and about 2.5 grams of a methallylsilane of the formula $$C_6H_5SiCH_2C=CH_2$$
$$\phantom{C_6H_5Si}|\phantom{CH_2}|$$
$$\phantom{C_6H_5Si}(CH_3)_2\ CH_3$$

was obtained.

EXAMPLE 5

A mixture containing $Cl_3SiH$ and diisobutylene in a mol ratio 10:1 was passed through a 1 inch by 12 inch tube heated to a temperature of 500° C. The mixture was passed through the tube at a rate of 0.72 ml. per minute. The vapors were conventionally condensed and about 75 percent of the diisobutylene was converted to a methallylsilane of the formula $$Cl_3SiCH_2C=CH_2$$
$$\phantom{Cl_3Si}|$$
$$\phantom{Cl_3Si}CH_3$$

EXAMPLE 6

When the following organosilicon compounds were substituted for the corresponding organosilicon compound of Example 1, the methallylsilanes noted on the following pages were obtained.

| Organosilicon compound | Methallylsilane |
|---|---|
| (1) $F_3SiH$ | $F_3SiCH_2C=CH_2$<br>$\phantom{F_3SiCH_2C=}|$<br>$\phantom{F_3SiCH_2C=}CH_3$ |
| (2) $(CH_3)_3Si-O-\underset{\underset{H}{|}}{\overset{\overset{CH_3}{|}}{Si}}-O-Si(CH_3)_3$ | $(CH_3)_3Si-O-\underset{\underset{CH_2C=CH_2}{\underset{\underset{CH_3}{|}}{|}}}{\overset{\overset{CH_3}{|}}{Si}}-O-Si(CH_3)_3$ |
| (3) $H\underset{\underset{C_6H_5}{|}}{\overset{\overset{C_6H_5}{|}}{Si}}H$ | $H_2C=C-H_2C-\underset{\underset{C_6H_5}{|}}{\overset{\overset{C_6H_5}{|}}{Si}}-CH_2C=CH_2$<br>$\phantom{H_2C=}|\phantom{-H_2C-Si-CH_2C=}|$<br>$\phantom{H_2}CH_3\phantom{-H_2C-Si-CH_2}CH_3$ |
| (4) $(CH_3)_3Si\left[-O-\underset{\underset{CH_3}{|}}{\overset{\overset{CH_3}{|}}{Si}}-\right]_6 O-SiH(CH_3)_2$ | $(CH_3)_3Si\left[-O-\underset{\underset{CH_3}{|}}{\overset{\overset{CH_3}{|}}{Si}}-\right]_6 O-\underset{\underset{(CH_3)_2}{|}}{Si}-CH_2C=CH_2$<br>$\phantom{xxxxxxxxxxxxxxxxxxxxxxxxxxxx}|$<br>$\phantom{xxxxxxxxxxxxxxxxxxxxxxxxxxxx}CH_3$ |
| (5) $C_6H_{13}SiH$<br>$\phantom{C_6H_{13}Si}|$<br>$\phantom{C_6H_{13}Si}(CH_3)_2$ | $C_6H_{13}Si-CH_2-C=CH_2$<br>$\phantom{C_6H_{13}Si}|\phantom{-CH_2-}|$<br>$\phantom{C_6H_{13}Si}(CH_3)_2\ CH_3$ |
| (6) $CH_3-\underset{\underset{CH_2CH_2CF_3}{|}}{\overset{\overset{Cl}{|}}{Si}}-H$ | $CH_3-\underset{\underset{CH_2CH_2CF_3}{|}}{\overset{\overset{Cl}{|}}{Si}}-CH_2-\underset{\underset{CH_3}{|}}{C}=CH_2$ |
| (7) $H\underset{\underset{Cl}{|}}{\overset{\overset{Cl}{|}}{Si}}H$ | $Cl-Si(CH_2-\underset{\underset{CH_3}{|}}{C}=CH_2)_2$ and $Cl-\underset{\underset{Cl}{|}}{\overset{\overset{H}{|}}{Si}}CH_2-\underset{\underset{CH_3}{|}}{C}=CH_2$ |
| (8) $(CH_3)_3Si\left[-O-\underset{\underset{CH_3}{|}}{\overset{\overset{CH_3}{|}}{Si}}-\right]_3 O-SiH$<br>$\phantom{xxxxxxxxxxxxxxxxxxxxxxxx}|$<br>$\phantom{xxxxxxxxxxxxxxxxxxxxxxxx}OCH_2CH_2CH_3$ | $(CH_3)_3Si\left[-O-\underset{\underset{CH_3}{|}}{\overset{\overset{CH_3}{|}}{Si}}-\right]_3 O-\underset{\underset{OCH_2CH_2CH_3}{|}}{\overset{\overset{CH_3}{|}}{Si}}-CH_2-\underset{\underset{CH_3}{|}}{C}=CH_2$ |

That which is claimed is:

1. A method for preparing methallylsilicon compounds containing the group

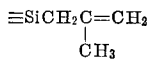

comprising
(A) contacting in an open system
  (1) an organosilicon compound selected from the group consisting of
    (a) silanes of the formula $R_4Si$, and
    (b) siloxanes of the formula

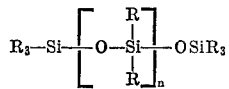

in which at least one R radical is a hydrogen atom and no more than 50 percent of the R radicals are hydrogen atoms, the remaining R radicals being selected from the group consisting of an alkyl radical of from 1 to 6 carbon atoms inclusive, an alkoxy radical of from 1 to 6 carbon atoms inclusive, a phenyl radical, a halogen atom, and a 3,3,3-trifluoropropyl radical, $n$ has a value of from 0 to 6 inclusive, with
  (2) diisobutylene,
(B) heating the above admixture to a temperature of from 400° C. to 600° C., and
(C) thereafter recovering the methallylsilane.

2. The method as recited in claim 1 in which the temperature is from 450° C. to 550° C.

3. The method as recited in claim 2 in which the silane (a) is of the formula $Cl_3SiH$.

4. The method as recited in claim 2 in which the silane (a) is of the formula

5. The method as recited in claim 2 in which the silane (a) is of the formula

6. The method as recited in claim 1 in which the temperature is from 500° C. to 600° C.

7. The method as recited in claim 6 in which the siloxane (b) is of the formula

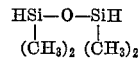

8. The method as recited in claim 6 in which the siloxane (b) is of the formula

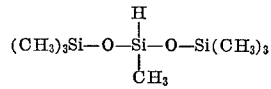

References Cited
UNITED STATES PATENTS

| | | | |
|---|---|---|---|
| 2,420,912 | 5/1947 | Hurd | 260—448.2 Q X |
| 2,595,727 | 5/1952 | Swiss et al. | 260—448.2 Q X |
| 3,085,120 | 4/1963 | Seyferth et al. | 260—448.2 Q X |

TOBIAS E. LEVOW, Primary Examiner
P. F. SHAVER, Primary Examiner

U.S. Cl. X.R.
260—448.2 H, 448.2 Q